United States Patent
van Lengerich et al.

(10) Patent No.: US 9,560,877 B2
(45) Date of Patent: Feb. 7, 2017

(54) CEREAL-BASED PRODUCT WITH IMPROVED EATING QUALITY FORTIFIED WITH DIETARY FIBER AND/OR CALCIUM

(75) Inventors: Bernhard H. van Lengerich, Plymouth, MN (US); Nathan W. Lukecart, Plymouth, MN (US); Friedrich P. Meuser, Berlin (DE); Dieter Oberdoerfer, Berlin (DE); Wolfgang Bindzus, Penthaz (CH)

(73) Assignee: General Mills, Inc., Minneapolis, MN (US)

( * ) Notice: Subject to any disclaimer, the term of this patent is extended or adjusted under 35 U.S.C. 154(b) by 215 days.

(21) Appl. No.: 13/418,980

(22) Filed: Mar. 13, 2012

(65) Prior Publication Data

US 2013/0243925 A1    Sep. 19, 2013

(51) Int. Cl.
A21D 13/00    (2006.01)

(52) U.S. Cl.
CPC ............... *A23L 33/21* (2016.08); *A23L 7/115* (2016.08); *A23L 7/17* (2016.08); *A23L 29/212* (2016.08); *A23L 33/15* (2016.08); *A23V 2002/00* (2013.01)

(58) Field of Classification Search
CPC ............... A23V 2200/326; A23V 2250/5106; A23V 2300/16; A23V 2200/21; A23L 1/0076; A23L 1/1016; A23L 1/1646; A23L 1/308; A23L 1/31436; A23L 1/164; A23L 1/0522; A23L 1/0088; A23L 1/10; C08L 2205/16
USPC ........................................................ 426/560
See application file for complete search history.

(56) References Cited

U.S. PATENT DOCUMENTS

| | | | |
|---|---|---|---|
| 3,786,123 A | 1/1974 | Katzen | |
| 3,962,416 A | 6/1976 | Katzen | |
| 4,568,550 A * | 2/1986 | Fulger | A21C 3/04 426/19 |
| 4,619,831 A | 10/1986 | Sharma | |
| 4,871,557 A * | 10/1989 | Linscott | 426/93 |
| 4,911,952 A | 3/1990 | Doane et al. | |
| 5,176,936 A | 1/1993 | Creighton | |

(Continued)

FOREIGN PATENT DOCUMENTS

| | | |
|---|---|---|
| CA | 1115115 A1 * | 12/1981 |
| EP | 0400531 | 12/1990 |

(Continued)

OTHER PUBLICATIONS

Pellet definition. http://www.thefreedictionary.com/pellet Retrieved Jun. 12, 2016.*

*Primary Examiner* — Katherine D LeBlanc
(74) *Attorney, Agent, or Firm* — Diederiks & Whitelaw, PLC; Gregory P. Kaihoi, Esq.

(57) ABSTRACT

Inhibition of expansion of a cereal product, such as a ready-to-eat cereal, by a particulate insoluble component such as fiber and/or calcium is avoided by pelletizing the particulate insoluble component. A binder component, such as gelatinized starch, is used to bind particles of the particulate insoluble component into a coherent mass which is formed into non-expanded pellets for fortification of the cereal product. The expanded cereal products, such as extruded puffed RTE cereals which contain the pellets, exhibit a crisp, uniform texture and cell structure, improved, prolonged bowl life, a non-gritty mouthfeel, and a smooth, uniform surface appearance even though they are fortified with high amounts of the solid or particulate insoluble nutritional components.

13 Claims, 3 Drawing Sheets

(56) References Cited

U.S. PATENT DOCUMENTS

| | | |
|---|---|---|
| 5,183,690 A | 2/1993 | Carr et al. |
| 5,258,189 A | 11/1993 | Efstathiou |
| 5,462,982 A | 10/1995 | Bastioli et al. |
| 6,004,594 A | 12/1999 | van Lengerich |
| 6,149,965 A | 11/2000 | van Lengerich et al. |
| 6,190,591 B1 | 2/2001 | van Lengerich |
| 6,436,453 B1 | 8/2002 | van Lengerich et al. |
| 6,468,568 B1 | 10/2002 | Leusner et al. |
| 6,500,463 B1 | 12/2002 | van Lengerich |
| 6,558,718 B1 | 5/2003 | Evenson et al. |
| 6,596,334 B1 | 7/2003 | Flickinger et al. |
| 6,835,558 B2 | 12/2004 | van Lengerich et al. |
| 7,201,923 B1 | 4/2007 | van Lengerich |
| 7,431,986 B2 | 10/2008 | van Lengerich et al. |
| 7,803,413 B2 | 9/2010 | van Lengerich et al. |
| 7,803,414 B2 | 9/2010 | van Lengerich et al. |
| 7,981,453 B2 | 7/2011 | Chen et al. |
| 8,142,831 B2 | 3/2012 | van Lengerich et al. |
| 2002/0044968 A1 | 4/2002 | van Lengerich |
| 2007/0141096 A1 | 6/2007 | van Lengerich et al. |
| 2008/0181991 A1* | 7/2008 | Schopf et al. ............... 426/96 |
| 2010/0021607 A1 | 1/2010 | van Lengerich et al. |
| 2010/0034926 A1 | 2/2010 | Frick |
| 2010/0310728 A1 | 12/2010 | van Lengerich et al. |
| 2012/0003360 A1 | 1/2012 | Barrett |

FOREIGN PATENT DOCUMENTS

| | | |
|---|---|---|
| EP | 0462012 A2 | 12/1991 |
| EP | 0465364 A1 | 1/1992 |
| WO | WO92/00130 | 1/1992 |
| WO | WO94/26883 | 11/1994 |
| WO | WO95/26752 | 10/1995 |
| WO | WO-97/25881 | 7/1997 |
| WO | WO98/18610 | 5/1998 |
| WO | WO-99/25198 | 5/1999 |
| WO | WO99/65336 | 12/1999 |
| WO | WO00/21504 | 4/2000 |
| WO | WO00/74501 | 12/2000 |
| WO | WO01/25414 | 4/2001 |
| WO | WO-2010/051181 | 5/2010 |
| WO | WO-2010/124922 | 11/2010 |
| WO | WO 2010132060 A1 * | 11/2010 |

* cited by examiner

CEREAL-BASED PRODUCT WITH IMPROVED EATING QUALITY FORTIFIED WITH DIETARY FIBER AND/OR CALCIUM

FIELD OF THE INVENTION

The present invention relates to expanded cereal-based products with improved eating quality which are fortified with particulate insoluble components such as dietary fiber and calcium, pellets for incorporation of the particulate insoluble component into an expanded cereal product, and methods for making the pellets and the expanded cereal-based products.

BACKGROUND OF THE INVENTION

The expansion of ready-to-eat (RTE) breakfast cereals depends on an unimpeded expansion of the molten starch. Solid insoluble particles like dietary fiber or calcium carbonate interfere with the bubble forming process and thus hamper the extent and direction of the expansion which adversely affect texture or mouthfeel, such as grittiness, surface appearance, and bowl-life of the finished cereal product. For example, the expansion of a twin screw extruded puffed cereal is reduced, product texture is softened, bowl-life is reduced, gritty mouthfeel is created, and surface appearance becomes less smooth and uniform. Dealing with all of these effects is challenging because there are multiple interconnected systemic parameters, such as viscosity and bubble nucleation, and mechanisms, such as rate of hydration and mechanical mixing at work. When RTE cereals are fortified with both fiber and calcium these challenges are further amplified.

U.S. Pat. No. 4,619,831 to Sharma discloses a dietary fiber composition prepared by coating ah insoluble fiber, such as enzymatically and chemically purified cereal bran, with a soluble fiber, such as a hydrocolloid, such as pectin or an alginate, where the amount of insoluble dietary fiber is about 92% to about 98.5% based on a dry weight, basis of the total composition.

WO 99/65336 to Clark et al discloses agglomerated granules having a granule size of 88 to 2000 microns which when added to an edible composition, substantially do not alter its sensory characteristics, where each agglomerated granule consists of agglomerated particles of a fortificant such as calcium carbonate and a binder which is preferably corn syrup.

WO 00/74501 to Hessel et al discloses wheat bran coated with psyllium, which is coated with pectin, which is coated with insoluble alginate, which is coated with glucose.

U.S. Pat. No. 7,981,453 to Chen et al discloses bran, cellulose, starch, a glucan, or a hydrocolloid in an amount of 45-75% by weight, which is coated with a lipid in an amount of from 10-35% by weight, which is coated with a protein in an amount of from 10-40% by weight.

Starch has been employed for the encapsulation of neutraceuticals, such as vitamins, minerals, fatty acids, and probiotics to prevent their oxidation and for controlled release. These formulations generally employ large amounts of starch for the encapsulation of the readily oxidizable materials, which reduces the amount of the neutraceutical available for incorporation into a foodstuff.

International Patent Publication No. WO 95/26752 (published Oct. 12, 1995) discloses the production of a food product for the enteric supply of a fatty acid, a fatty acid containing substance, an amino acid, or an amino acid containing substance by at least partially complexing the fatty acid or amino acid in the amylose helix of starch to mask the acid. The product may contain one or more flavors and colors, fat soluble substances, anti-oxidants, or pharmacologically effective substances. The components may be first dry mixed and subsequently fed into an extruder where they are substantially mixed and subsequently heated above the gelatinization temperature of the starch to obtain an elasticized mass which is extruded and formed into pellets.

The production of expanded products is disclosed in European patent publication nos. EP 0465364 A1 (published Jan. 8, 1992) and EP 0462012 A2 (published Dec. 18, 1991), U.S. Pat. No. 3,962,416 to Katzen and U.S. Pat. No. 3,786,123 to Katzen. The two European patent publications disclose the production of an anti-obesity food and a method for making it by extrusion of starches with fatty acids into an expanded product having densities between 0.1 and 0.3 g/cm$^3$. U.S. Pat. No. 3,962,416 to Katzen discloses an expanded product which contains at least one nutrient and one gelatinized starch. U.S. Pat. No. 3,786,123 to Katzen discloses a method for producing encapsulated nutrients using extrusion temperatures of between 250° F. and 400° F. and extrusion pressures of between 200 psi to 2500 psi. A high protein encapsulating agent containing up to 40% starch-may be used. The starch is gelatinized and extruded into an expanded product.

International Patent Publication No. WO 92/00130 (published Jan. 9, 1992) discloses continuous process for obtaining an encapsulated, biologically active product in a starchy matrix. A biologically active agent and starch are mixed before extrusion and extruded as a blend, with the encapsulant or biologically active agent being heated together with the starch. Alternatively, a core material to be encapsulated may be added and blended with an aqueous dispersion of starch after the starch and water have been subjected to an elevated temperature sufficient to gelatinize the starch. The extrusion process, it is disclosed, exposes the mix to high shear mechanical action at a temperature above the gelatinization temperature of the starch.

U.S. Pat. No. 5,183,690 to Carr, et al. discloses a continuous process for imparting predetermined release properties to an encapsulated biologically active agent in a matrix of starchy material. The starchy material, an active agent, and water are continuously blended in an ingredient stream wherein the starchy material, is at a solids concentration of at least 40%. The ingredients stream is continuously extruded as an extrudate and the extrudate is continuously recovered. The conditions of blending, extruding, and recovering are preselected to yield the predetermined release properties.

U.S. Pat. No. 6,190,591 and International Publication No. WO 98/18610, published oh May 7, 1998, both to Bernhard H. van Lengerich, disclose a controlled release particulate composition which contains a hydrophobic component for controlling the release of an encapsulated and/or embedded active component from a plasticized matrix. The controlled release or delayed release composition may be produced without substantial expansion of the matrix material to thereby avoid production of a low density product which prematurely or too rapidly releases the encapsulant or the embedded component.

International Publication No. WO 00/21504 published on Apr. 20, 2000, U.S. Pat. No. 6,500,463 to Van Lengerich, and International Publication No. WO 01/25414 published on Apr. 12, 2001, disclose a continuous process for producing shelf-stable, controlled release, discrete, solid particles from a liquid encapsulant component which contains a sensitive encapsulant, such as a heat sensitive or readily oxidizable pharmaceutically, biologically, or nutritionally active component, such as essential and/or highly unsaturated fatty acids. A liquid encapsulant component which contains an active, sensitive encapsulant, such as a live microorganism or an enzyme dissolved or dispersed in a liquid plasticizer is admixed with a plasticizable matrix material. The matrix material is plasticizable by the liquid plasticizer and the encapsulation of the active encapsulant is accomplished at a low temperature and under low shear conditions.

The present invention provides a method and product for incorporation of a particulate insoluble component, such as dietary fiber and calcium, into an expanded cereal product, without substantial inhibition of expansion of the cereal product by the particulate insoluble component. Solid insoluble particles such as dietary fiber or calcium are pelletized so that they do not interfere with the bubble forming process and do not hamper the extent and direction of the expansion which adversely affect texture or mouthfeel, such as grittiness, surface appearance, and bowl-life of the finished cereal product. Expanded cereal products, such as extruded puffed RTE cereals, produced in accordance with the present invention are fortified with high amounts of solid or particulate insoluble nutritional components such as dietary fiber and calcium but exhibit a crisp, uniform texture and cell structure, improved, prolonged bowl life, non-gritty mouthfeel, and a smooth, uniform surface appearance. The pelletized neutraceutical products contain relatively low amounts of starch or other materials employed for encapsulation of neutraceuticals which increases the amount of the insoluble nutritional component available for fortification of or incorporation into expanded RTE cereal products.

SUMMARY OF THE INVENTION

In accordance with the present invention, a pellet for incorporation of a particulate insoluble component into an expanded cereal product comprises particles of an insoluble component, such as fiber and/or calcium, bound together by a binder component which binds the particles of the insoluble component into a coherent mass to avoid inhibition of expansion of the cereal product by the particulate insoluble component. The binder component may be one or more of a partially gelatinized starch, of fully gelatinized starch. The degree of gelatinization of the starch employed in the binder component provides sufficient binding to bind the particles of the particulate insoluble component, such as fiber, into a pellet, and may generally be at least about 25%, preferably at least about 75%, most preferably at least about 90% starch gelatinization, as measured by differential scanning calorimetry (DSC). The amount of binder component may be from about 5% by weight to about 40% by weight, preferably from about 1.0% by weight to about 25% by weight, most preferably from about 15% by weight to about 20% by weight, based upon the total dry weight of the particulate insoluble, component and the binder component. The amount of the insoluble component may be from about 60% by weight to about 95% by weight, preferably from about 75% by weight to about 90% by weight, most preferably from about 80% by weight to about 85% by weight, based upon the total dry weight of the particulate insoluble component and the binder component. The pellet may have a particle size of from about 200 µm to about 2 mm, preferably from about 500 µm to about 1.5 mm, most preferably from about 800 µm to about 1200 µm. The total amount of the insoluble component and the binder component may be at least about 75% by weight of the pellet, preferably, at least about 90% by weight, up to 100% by weight, based upon the weight of the pellet. The pellet may optionally contain at least one additive in an amount of up to about 25% by weight of the pellet. The binder component may comprise a gelatinized starch in an amount of at least about 50% by weight, preferably at least about 75% by weight, more preferably at least about 90% by weight, up to 100% by weight, based upon the weight of the binder component, and an optional additional binder or binding agent in an amount of up to about 50% by weight, based upon the weight of the binder component.

In an aspect of the invention, a cereal product comprises pieces of expanded ready-to-eat cereal and the pellets of the present invention which are distributed substantially uniformly throughout the pieces of expanded ready-to-eat cereal. The expanded cereal pieces have a cell structure comprising cell walls which form voids, and the pellets are partially or completely contained in the cell walls or attached to the cell walls.

In an another aspect of the invention, the pellets for incorporation of a particulate insoluble component, such as fiber and/or calcium, into an expanded cereal product and to avoid inhibition of expansion of the expanded cereal product by the particulate insoluble component, may be produced by first forming a pellet dough. The dough may be produced by admixing a particulate insoluble component, water, and a binder component in an extruder to bind the particles of the particulate insoluble component into a coherent substantially homogeneous mass, without substantial alteration of the native structure of the insoluble component such as the native structure of fiber. The dough may be extruded through a die to obtain ah extrudate rope, the extrudate rope may be cut into pieces, and the pieces may be dried to obtain pellets. The particulate insoluble component which is added to the extruder may have a particle size of at least about 200 µm, for example at least about 300 µm, but less than about half the diameter of the extrusion die or extrudate rope. The extrusion may be conducted so as to avoid expansion of the dough or extrudate of insoluble component and binder, component as it exits from the die, for example, at a temperature of the mass at the extruder exit of less than 100° C. and a pressure of less than about 150 bars. The binder component may be a gelatinized starch which is produced by partially or fully gelatinizing a raw, or native starch, or ungelatinized starch in the extruder, or it may be a pre-gelatinized starch which is added to the extruder and then plasticized within the extruder by the water.

In another aspect of the invention, an expanded cereal product, such as a ready-to-eat cereal, which is fortified with a particulate insoluble component, such as fiber and/or calcium, may be produced by admixing at least one flour, water, and the pellets of the present invention in an extruder to form a substantially homogeneous dough, extruding the dough through an extruder die to expand the dough, and cutting the expanded dough into pieces to obtain an expanded ready-to-eat cereal wherein a plurality of the pellets are distributed substantially uniformly throughout the pieces of expanded ready-to-eat cereal. The expanded cereal pieces have a cell structure comprising cell walls which form voids, and the pellets are partially or completely contained in the cell walls or attached to the cell walls. The amount of the pellets may be from about 5% by weight to about 50% by weight, preferably from about 10% by weight to about 30% by weight, most preferably from about 15% by weight to about 25% by weight, based upon the total weight of the final product, such as a ready-to-eat cereal. The expanded cereal products, such as extruded puffed RTE cereals, produced in accordance with the present invention are fortified with high amounts of solid or particulate insoluble nutritional components, such as dietary fiber and calcium. Even though large amounts of the insoluble components such as fiber and/or calcium are incorporated into the expanded RTE cereal, the cereal exhibits a crisp, uniform texture and cell structure, improved, prolonged bowl life, non-gritty mouthfeel, and a smooth, uniform surface appearance. The extent and direction of the expansion is essentially unhampered by the incorporation of the insoluble components, and is the same or substantially the same as for products which do not contain the insoluble components.

BRIEF DESCRIPTION OF THE DRAWINGS

The present invention is further illustrated by the accompanying drawings; wherein.

DETAILED DESCRIPTION OF THE INVENTION

The present inventors have found that the combination of a particulate insoluble component, such as fiber and/or calcium, and a binder component, such as gelatinized starch, to bind the particles of the insoluble component into a coherent mass which is formed into non-expanded pellets avoids inhibition of expansion of a cereal product, such as a ready-to-eat cereal, by the particulate insoluble component. The expanded cereal products, such as extruded puffed RTE cereals, exhibit a crisp, uniform texture and cell structure, improved, prolonged bowl life, a non-gritty mouthfeel, and a smooth, uniform surface appearance even though they are fortified with high amounts of the solid or particulate insoluble nutritional components. The pelletized neutraceutical products contain relatively low amounts of the gelatinized starch or other binding agents which increases the amount of the insoluble nutritional component available for fortification of or incorporation into expanded RTE cereal products.

The particulate insoluble component which is incorporated into the cereal product may be one or more of any particulate insoluble food ingredient, neutraceutical, or nutritional ingredient which would otherwise inhibit expansion of a ready-to eat cereal. As used herein the particulate insoluble component includes any material which is at least 40% by weight, for example at least 60% by weight, or essentially completely insoluble in water at room temperature. Exemplary of particulate insoluble components are fiber and dietary minerals, such as a calcium, zinc, magnesium, iron, phosphorous, iodine, manganese, copper, selenium, molybdenum, sulfur, cobalt, nickel, chromium, fluorine, boron, and strontium salts, and mixtures thereof. Exemplary of particulate insoluble components which are dietary minerals which may be employed in the present invention are calcium carbonate, calcium oxalate, calcium citrate, calcium phosphate, such as tricalcium phosphate, zinc carbonate, zinc oxide, and mixtures thereof.

The fiber may be any particulate insoluble fiber from any source, including sources of dietary fiber which contain both insoluble fiber and soluble fiber. As used herein, total dietary fiber ("TDF") comprises both soluble dietary fiber ("SDF") and insoluble dietary fiber ("IDF"). As used herein "dietary fiber" includes soluble and insoluble components of plant cell walls that are not digested by endogenous (non-bacterial) enzymes of a human digestive tract. Dietary fiber is not absorbed in the small intestine and thus enters the large intestine (colon). "Insoluble fiber" includes oligo- and polysaccharides such as cellulose and hemicellulose. "Soluble fiber" is used to denote fiber that is at least 50% soluble according to the method described by L. Prosky et al., J. Assoc. Off. Anal. Chem., 71, 1017-1023 (1988). Examples of soluble fiber include pectin, beta-glucans (small cellulose-type branched glucose polymers), and gums such as xanthan gum. Uses of fiber additives in foods are reported as dietary fiber under the Nutrition Labeling and Education Act (NLEA) of 1990.

Exemplary of sources of insoluble fiber which may be employed in the present invention are whole wheat, oat, corn, barley, rye, rice, and especially in the bran of these cereals, fruits (such as apple, citrus, prune, mango, fig, etc.), vegetables (such as tomato, carrot, celery, etc.) or cocoa, resistant starch, and mixtures thereof. Preferred particulate insoluble components which are fibers for use in the present invention include wheat bran, wheat fiber, corn bran, oat hull fiber, pea hull fiber, soy hull fiber, soy cotyledon fiber, sugar beet fiber, rice fiber, barley fiber, rye fiber, resistant starch, sugar cane fiber, sorghum fiber, vegetable fiber, fruit fiber, microcrystaliine cellulose, and mixtures thereof.

In embodiments of the invention, combinations of fiber, such as wheat bran, and dietary minerals, such as calcium carbonate may be employed.

Commercially available particulate insoluble components, such as bran and dietary minerals may be employed. They may be in powdered form in the case of dietary minerals or may be in milled or ground form in the case of fibers. In embodiments of the invention, the particulate insoluble component may have a particle size of at least about 200 µm, for example at least about 300 µm, but generally less than about half the diameter of the extrusion die or extrudate rope, or pellet, or up to about 1 mm.

The binder component employed in the present invention binds or glues the particles of the particulate insoluble component so that they stick together and form a coherent mass, which greatly reduces the surface area of the particulate insoluble component, and avoids inhibition of expansion of the cereal product by the particulate insoluble component. The binder component employed in the present invention includes a gelatinized starch alone or in combination with one or more additional binding agents. The gelatinized starch may be partially gelatinized or fully gelatinized. The degree of gelatinization of the starch employed in the binder component provides sufficient binding to bind the particles of the particulate insoluble component, such as fiber, into a pellet, and may generally be at least about 25%, preferably at least about 75%, most preferably at least about 90% starch gelatinization, as measured by differential scanning calorimetry (DSC). The gelatinized starch is preferably produced by gelatinizing a raw or native starch in-situ during the pelletization of the particulate insoluble component. In other embodiments, a pregelatinized starch or modified starch may be employed which can be plasticized by a liquid plasticizer such as water during the production of the pellets to obtain a plasticized mass which binds the particles of the particulate insoluble component.

Exemplary of raw or native starches which may be employed to obtain the at least partially gelatinized starch or modified or pregelatinized starch of the binder component include starches derived from corn, wheat, rice, potato, tapioca, or high amylose starch, and mixtures thereof. Sources of starch which may be used also include whole grain or refined flours from grains such as corn, wheat, durum wheat, rice, barley, oats, rye, and mixtures thereof.

Examples of optional one or more binding agents which may be used with the at least partially gelatinized starch include hydrocolloids such as carrageenans, alginates, xanthan gum, gum arabic, guar flour or guar gum, agar, tragacanth, karaya, locust bean gum, and pectin, soluble fiber such as fructo-oligosaccharides, inulin, galacto-oligosaccharides, xylo-oligosaccharides, manno-oligosaccharides, polydextrose, resistant dextrins, cyclo-dextrins, acacia gum, larch gum, galactomannans such as locust bean gum, tara gum, fenugreek, glucomannans or konjac flour, psyllium, high-methoxy pectins, beta-glucans from oat or barley, arabinoxylans from wheat, and chemically modified cellulosics, converted starches, dextrins, maltodextrins, glucose syrups, sugars, such as mono- and di-saccharides, wheat gluten, such as vital wheat gluten or isolated gluten, vegetable or dairy proteins such as protein from soy or milk. The additional binding agents, such as maltodextrins, mono- or di-saccharides may be used to affect disaggregation and adherence for increasing the adherence between insoluble particulates and/or to aid the functionality and properties of the gelatinized starch binder.

The amount of the at least partially gelatinized starch employed may be at least about 50% by weight, preferably at least about 75% by weight, more preferably at least, about 90% by weight, up to 100% by weight, based upon the weight of the binder component. The amount of the optional additional binder or binding agent may be tip to about 50% by weight, for example up to about 25% by weight, generally up to about 10% by weight, based upon the weight of the binder component.

The amount of binder component may be from about 5% by weight to about 40% by weight, preferably from about 10% by weight to about 25% by weight, most preferably from about 15% by weight to about 20% by weight, based upon the total dry weight of the particulate insoluble component and the binder component. The amount of the insoluble component may be from about 60% by weight to about 95% by weight, preferably from about 75% by weight to about 90% by weight, most preferably from about 80% by weight to about 85% by weight, based upon the total dry weight of the particulate insoluble component and the binder component.

The total amount of the insoluble component and the binder component may be at least about 75% by weight of the pellet, preferably, at least about 90% by weight, up to 100% by weight, based upon the weight of the pellet. The pellet may optionally contain at least one additive in an amount of up to about 25% by weight of the pellet.

Exemplary of the one or more additives which may be employed in the pellets are glycerol, polyethylene glycol, sorbitol, fats or oils, and other softeners for manipulating or controlling the softness of the pellet. In embodiments of the invention, the pellets may be gluten-free for use in the production of gluten-free cereal products.

The pellet may have a particle size of from about 200 μm to about 2 mm, preferably from about 500 μm to about 1.5 mm, most preferably from about 800 μm to about 1200 μm.

The pellets of the present invention may be produced by forming a dough by admixing a particulate insoluble component, water, and a binder component in an extruder to bind the particles of the particulate insoluble component into a coherent mass, without substantial alteration of the native structure of the insoluble component such as the native structure of fiber. When the binder component includes more than one binder or binding agent, they may be added as a substantially homogeneous dry preblend, or separately added to the extruder and admixed therein. In embodiments of the invention, when more than one particulate insoluble component is employed, they may be added as a preblend or separately added to the extruder. Also, the particulate insoluble component and the binder component may be added as a substantially homogeneous dry preblend or separately added to the extruder.

The amount of water employed should be sufficient to form an extrudable homogeneous dough or plasticized mass. Exemplary amounts of water which may be used are from about 10% by weight to about 50% by weight, generally from about 20% by weight to about 40% by weight, based upon the total weight of the dough.

The extrusion may be conducted so as to avoid expansion of the dough or extrudate of insoluble component and binder component as it exits from the die. For example, the extrusion may be conducted so that the temperature of the mass at the extruder exit is less than 100° C. and the extruder pressure is less than about 150 bars. When the binder component is a gelatinized starch which is produced by gelatinizing a raw, or native starch, or ungelatinized starch in the extruder, the extrusion temperature should be above the gelatinization temperature of the starch. Extrusion temperatures below the gelatinization temperature, of starch, such as room temperature, may be employed when the binder component is a pre-gelatinized starch which is added to the extruder and then plasticized within the extruder by the water. The dough may be extruded through a die to obtain an extrudate rope, the extrudate rope may be cut into pieces, and the pieces may be dried to obtain pellets.

In embodiments of the invention, a dough comprising all ingredients may be made using a conventional batch mixer and a conventional continuous mixer with subsequent extrusion using a single screw extruder. In other embodiments of the invention, the dough can be made continuously using a continuous mixer or extruder alone. Twin screw extruders or co-rotating twin screw mixers may be advantageously used which enable the steps of continuously mixing the dough and subsequently extruding the dough through an extrusion die plate. Co-rotating intermeshing twin screw extruders, such as those available from Buhler, Switzerland, Clextral France; Werner and Pfleiderer Germany, APV England or Wenger USA, or a Co-Kneader, available from Buss, Switzerland may be employed.

For feeding solid components to an extruder, conventional solids feeding devices such as a volumetric or gravimetric feeder may be used. Liquid injection nozzles may be used for injecting liquid components or solutions, dispersions, emulsions or suspensions.

The admixing of the ingredients inside the extruder may be accomplished by using an appropriate extrusion screw configuration for achieving low shear mixing. For example, a combination of alternating small pitch conveying elements with distributive mixing elements, that are staggered at an angle to each other for providing axially oriented leakage flow inside the/extruder barrel may be employed. The combination of alternating conveying elements with distributive mixing elements cause the material flow to be continuously interrupted without shearing of the mass thus resulting in mixing of the material at low mechanical energy input. In other embodiments of the invention, other extruder screw configurations, may be used that facilitate low shear distributive mixing, such as screw elements of the type ZME, TME, SME, and so-called IGEL elements commercially available from Werner and Pfleiderer.

The total length of the distributive mixing section may be about 3 to 12 l/d, preferably about 4 to 6 l/d to sufficiently admix and distribute the binding component with the particulate, insoluble component. The at least substantially homogeneous mixture of plasticized binding component and particulate insoluble component may then be conveyed towards an extruder die plate. The conveying may be achieved by the use of low pitch extruder screw conveying elements which build up sufficient pressure prior to extruding the mix so that it can be forced through the apertures in the die plate. Another function of the low pitch elements is that they increase the degree of fill inside the last extruder barrel section. The increased degree of fill enables control of the temperature profile of the mix inside the extruder barrel for achieving optimum viscosity adjustment and extrusion through the subsequent die openings. The dough or crumbly mass or mix may be extruded, pressed or compressed through extrusion dies having aperture diameters of from about 0.1 mm to about 2 mm, preferably from about 0.5 mm to about 1.5 mm. The diameter of the extrudate rope and product may be larger than the diameter of the die apertures due to deformation or swelling as the composition exits the die. The increase in diameter upon exiting the die may occur with no or substantially no development of an expanded, puffed, foamy, or cellular structure. The extruded rope may have a cross-sectional diameter of from about 0.2 mm to about 2 mm, preferably from about 0.5 mm to about 1.5 mm, most preferably from about 0.8 mm to about 1.2 mm.

The extrudate rope may be cut at the die face using a rotating cutter, pelletizer, or rotating knives. In other embodiments, the extrudate rope may be cut away from the die using conventional cutting or forming means for producing pellets or tablets. The cut pieces or pellets, may have a length:diameter ratio (l/d ratio) of about 0.5 to 10, preferably about 1.

After cutting, the resulting pieces or pellets may be dried to a sufficiently low moisture content which assures a sufficiently prolonged storage stability or shelf life. For example, the pellets may be dried to achieve a storage stability or shelf life of at least about six months, preferably at least about twelve months, most preferably at least about thirty-six months. In embodiments of the present invention, the drying may be performed using conventional drying equipment using drying temperatures which do not adversely affect the thermal stability of the components. Exemplary drying temperatures may range from about 20° C. to about 90° C., generally from about 60° C. to about 85° C. The drying may be conducted to achieve a moisture content of less than about 30% by weight, preferably less than about 12% by weight, most preferably less than about 10% by weight, for example less than about 8% by weight. The product may be dried using a conventional fluidized bed or other conventional drying means.

The pellets of the present invention may be used to fortify conventional cereal product formulations, to produce fortified cereal products, such as ready-to eat cereals, using conventional cereal processing equipment and processes. For example, an expanded cereal product, such as a ready-to-eat cereal, which is fortified with a particulate insoluble component, such as fiber and/or calcium, may be produced by admixing at least one flour, water, and the pellets of the present invention in an extruder to form a dough in conventional manner. The flour may be any flour conventionally employed in the production of cereal products such as whole grain or refined flours from grains such as corn, wheat, durum wheat, rice, barley, oats, rye, and mixtures thereof.

The dough may be extruded through an extruder die to expand the dough, using conventional extrusion temperatures and pressures employed for the production of expanded ready-to-eat cereals or snacks. Exemplary extrusion temperatures may range from about 100° C. to about 150° C., generally from about 105° C. to about 135° C., and extrusion pressures may range from about 10 bar to about 100 bar, generally from about 25 bar to about 75 bar. The expanded dough may be cut into pieces to obtain an expanded ready-to-eat cereal or snack. The expanded RTE cereal or snack may have a plurality of the pellets distributed substantially uniformly throughout the pieces of expanded ready-to-eat cereal or snack. The expanded cereal pieces have a cell structure comprising cell walls which form voids, and the pellets are partially or completely contained in the cell walls or attached to the cell walls. The pellets may be substantially unexpanded in the expanded cereal product. During the extrusion and/or expansion process, the starch of the cereal product may be melted to form a molten starch matrix without interference or deleterious interaction with the particulate insoluble component such as fiber or calcium. The reduced contact area achieved by pelletizing the particulate insoluble component, such as fiber or calcium, prior to the production of the expanded cereal product reduces or eliminates the negative influence of the particulate insoluble component on the molten starch matrix and expansion process, such as the number of air cells produced, and the thickness of the cell walls in the expanded product.

The amount of the pellets may be from about 5% by weight to about 50% by weight, preferably from about 10% by weight to about 30% by weight, most preferably from about 15% by weight to about 25% by weight, based upon the total weight of the final product, such as a ready-to-eat cereal or expanded snack. The expanded cereal products, such as extruded puffed RTE cereals, produced in accordance with the present invention are fortified with high amounts of solid or particulate insoluble nutritional components, such as dietary fiber and calcium. Even though large amounts of the insoluble components such as fiber and/or calcium are incorporated into the expanded RTE cereal, the cereal exhibits a crisp, uniform texture and cell structure, improved, prolonged bowl life, non-gritty mouthfeel, and a smooth, uniform surface appearance. The extent and direction of the expansion is essentially unhampered by the incorporation of the insoluble components, and is the same or substantially the same as for products which do not contain the insoluble components.

The present invention is further illustrated by the following non-limiting examples where all parts, percentages, proportions, and ratios are by weight, all temperatures are in ° C., and all pressures are atmospheric unless-otherwise indicated.

EXAMPLE 1

Production of Fiber Pellets

A dry matrix blend consisting of 15 parts starch and 85 parts dietary fiber was fed into a feed port of a Werner &

Pfleiderer twin screw extruder at a rate of 4 kg/hr. Water was fed at a rate of 1.6 kg/hr into the same barrel of the twin screw extruder. All barrels of the extruder were kept at a temperature of 16° C. The die consisted of 40 circular openings, each 1 mm in diameter. At a screw speed of 150 rpm, the above ingredients were conveyed and formed into a dough that was extruded through the die openings at a pressure of 100 bar and a product temperature of 90° C. On a calculated basis, the rate of extrudate per die area is 0.1783 kg/hr per mm$^2$. Upon exiting the die, the exiting ropes were cut with rotating knives into discrete particles of 1 mm length and dried in a convection oven until their moisture content was below 5% wmb. The resulting pellets contain insoluble dietary fibers which were stuck together by plasticized starch particles.

EXAMPLE 2

Production of Fiber Pellets

Fiber pellets may be produced as in Example 1 except a dry matrix blend consisting of 20 parts starch and 80 parts dietary fiber may be employed.

EXAMPLE 3

Production of Fiber Pellets

Fiber pellets may be produced as in Example 1 except a dry matrix blend consisting of 25 parts starch and 75 parts dietary fiber may be employed.

EXAMPLE 4

Production of Fiber Pellets

Fiber pellets may be produced as in Examples 1 to 3 except wheat bran may be used as a source of part of the starch as well as the fiber source.

EXAMPLE 5

Production of Fiber Pellets of Varying Hardness

Figure 1:
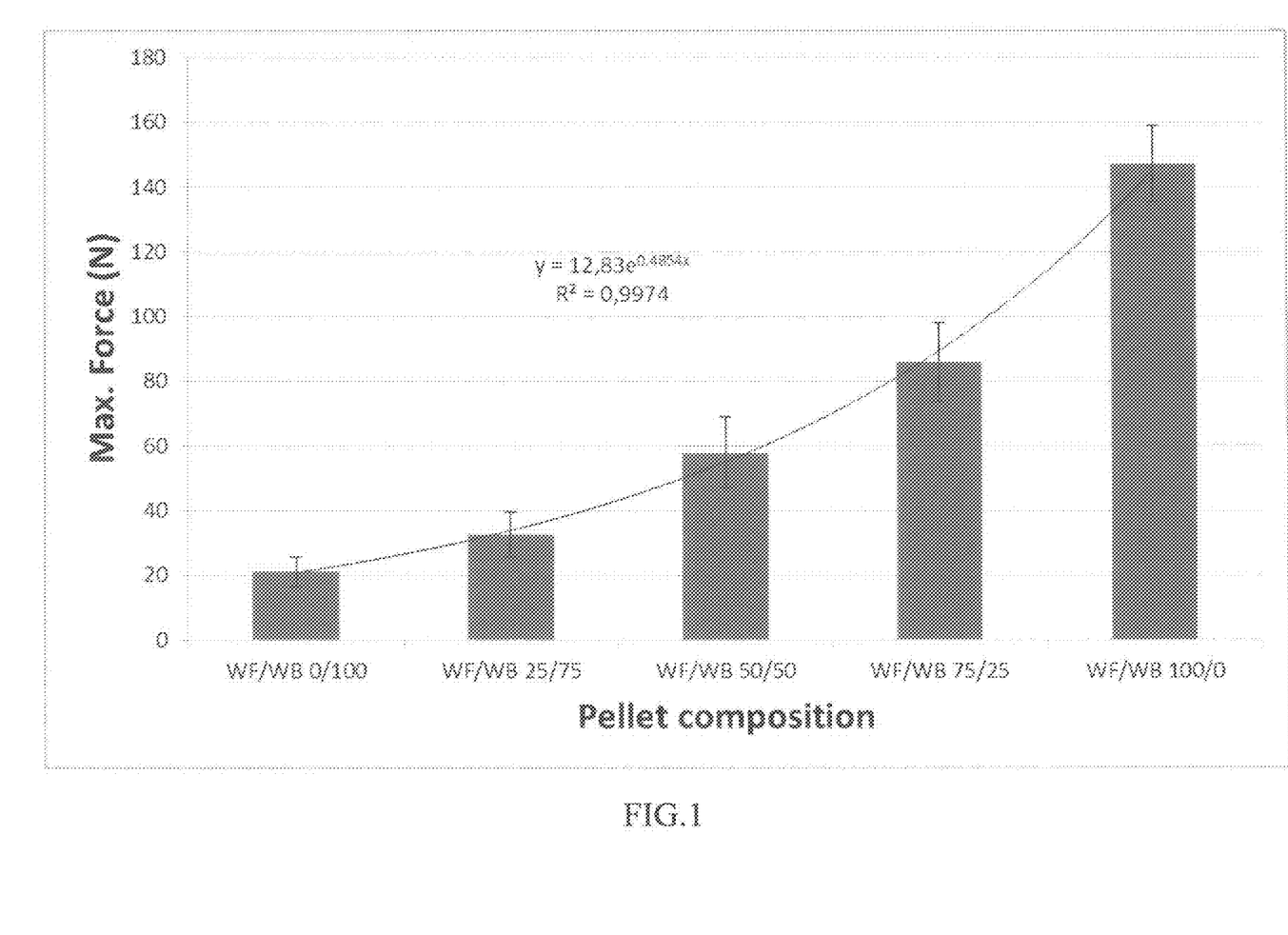
FIG. 1 is a graph showing variation of pellet hardness as a function of pellet composition for different ratios of wheat fiber and wheat bran.

In the Example, the hardness of fiber pellets is altered by changing their fiber composition. Different dry matrix blends consisting of 15 parts starch and 85 parts dietary fiber were prepared. The 85 parts of dietary fiber consisted of wheat bran/wheat fiber mixtures. The mixtures were changed by varying the ratio of wheat bran and wheat fiber in the range of (100:00, 75:25, 50:50, 25:75, 00:100). The prepared mixtures were fed into a feed port of a Werner & Pfleiderer twin screw extruder at a rate of 4 kg/hr. Water was fed at a rate of 1.6 kg/hr into the same barrel of the twin screw extruder. All barrels of the extruder were kept at a temperature of 16° C. The die consisted of 40 circular openings, each 1 mm in diameter. At a screw speed of 150 rpm, the above ingredients were conveyed and formed into a dough that was extruded through the die openings at a pressure of 90 bar and a product temperature of 90° C. Upon exiting the die, the exiting ropes were cut with rotating knives into discrete particles of 1 mm length and dried in a convection oven until their moisture content was below 5% wmb. The resulting pellets contain insoluble dietary fibers which were stuck together by plasticized starch particles. The pellets made from different wheat bran (WB)/wheat fiber (WF) compositions had different hardnesses. The hardness was expressed as a maximum force (N) required for a cut through the pellet, and the results are shown in FIG. 1 as ranging from about 20N to about 145N, with hardness increasing as the proportion of wheat fiber increases and the portion wheat bran decreases.

EXAMPLE 6

Use of Dietary Fiber Pellets in Extruded Products

Figure 2A:
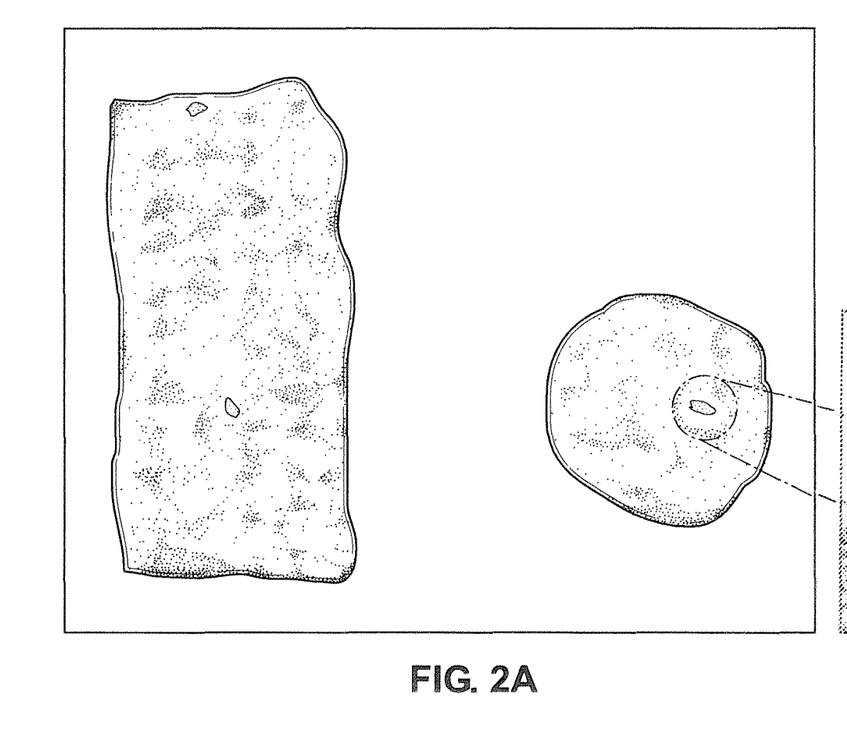
FIG. 2A is a photograph showing fiber pellets in an expanded wheat flour extrudate (stained wheat fiber pellets, wheat fiber WF 600, Vitacell)
Figure 2B:
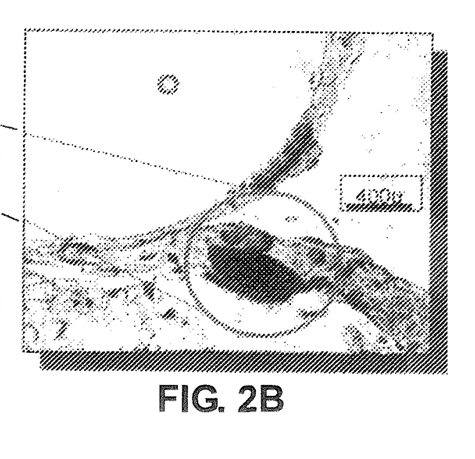
FIG. 2B is a photomicrograph showing a portion of the extrudate of FIG. 2A where the fiber pellet is incorporated into the cell wall structure of the extrudate.

A dry matrix blend consisting of 90 parts wheat flour and 10 parts of dietary fiber pellets as obtained in Example 1 was fed into a feed port of a Werner & Pfleiderer twin screw extruder at a rate of 7.38 kg/hr. Water was fed at a rate of 0.405 kg/hr into the same barrel of the twin screw extruder. The first two barrel segments were kept at 16° C. The barrel segments 3, 4, 5, and 6 were heated to 110° C. The die consisted of 1 circular opening of 3 mm in diameter. At a screw speed of 275 rpm, the above ingredients were conveyed and formed into a dough that was extruded through the die opening at a pressure of 50 bar and a product temperature of 130° C. Upon exiting the die, the expanded exiting ropes were collected on trays and dried in a convection oven at 80° C. for 1 hr. The resulting products contained pelletized dietary fiber. The fiber pellets remained intact after the extrusion and were integrated into the cell walls of the expanded structure as shown in FIGS. 2A and 2B.

EXAMPLE 7

Influence of Pellet Disintegration on Expansion Properties

Figure 3:
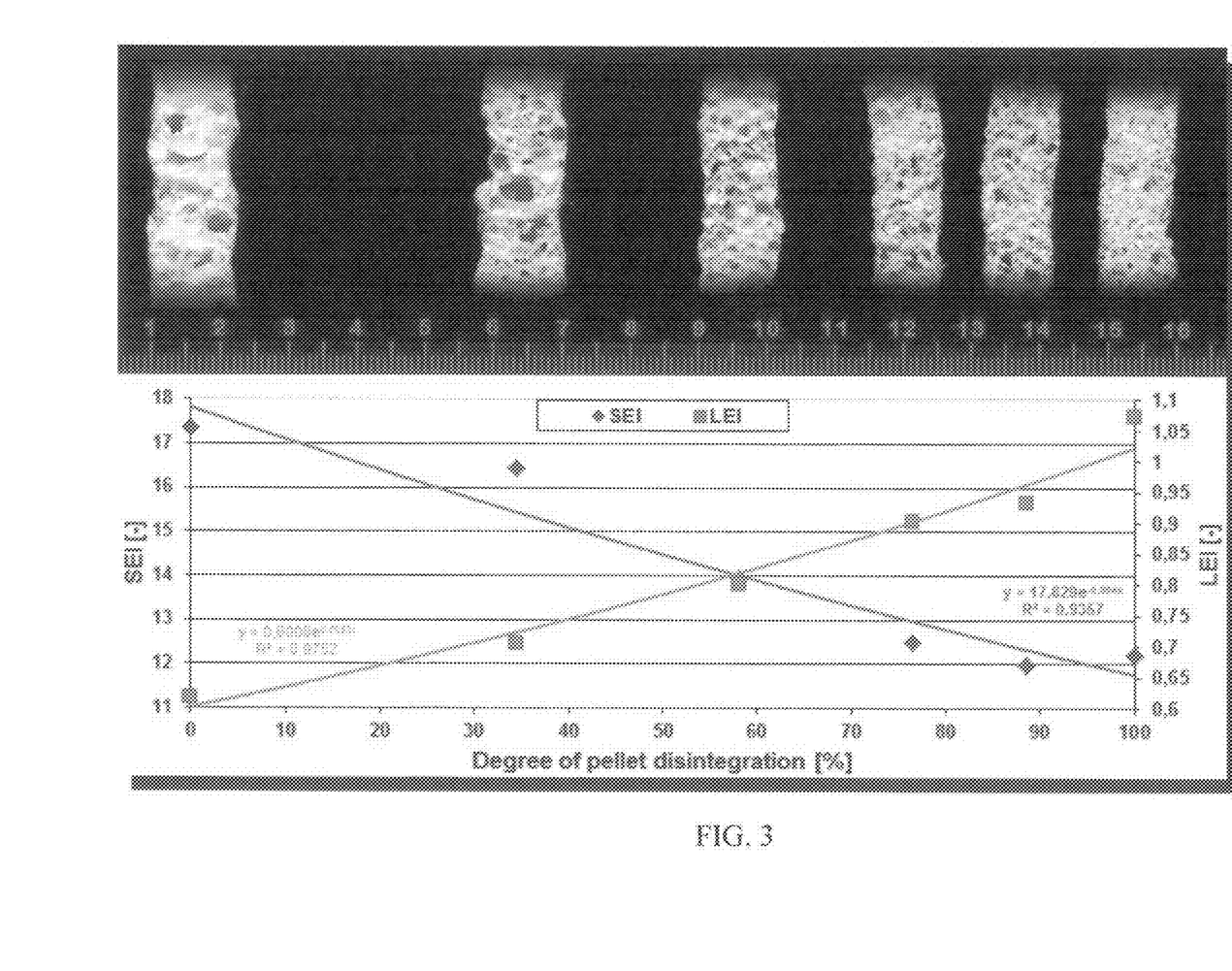
FIG. 3 shows the influence of pellet disintegration on the expansion properties of an extruded; expanded breakfast cereal in terms of cell structure, sectional expansion (SEI) and longitudinal expansion (LEI) using different ratios of pelletized and unpelletized wheat fibers.

Five different matrix blends consisting of 95 parts wheat flour and 5 parts of dietary fiber were prepared. The 5 parts of dietary fiber were changed for each blend by using different ratios of pelletized and unpelletized wheat fibers. The prepared blends were fed into a feed port of a Werner & Pfleiderer twin screw extruder at a rate of 7.38 kg/hr. Water was fed at a rate of 0.405 kg/hr into the same barrel of the twin screw extruder. The first two barrel segments were kept at 16° C. The barrel segments 3, 4, 5, and 6 were heated to 110° C. The die consisted of 1 circular opening of 3 mm in diameter. At a screw speed of 275 rpm, the above ingredients were conveyed and formed into a dough that was extruded through the die opening at a pressure of 50 bar and a product temperature of 130° C. Upon exiting the die, the expanded exiting ropes were collected on trays and dried in a convection oven at 80° C. for 1 hr. The resulting products contained pelletized dietary fiber with a different degree of disintegration (dod). As shown in FIG. 3, the higher the degree of disintegration was, the higher was the negative influence of fiber on the expansion and texture properties. The sectional expansion (SEI) decreased and the longitudinal expansion (LEI) increased if the dod increased. The air cells in the product became smaller and denser if the dod increased as shown in FIG. 3.

What is claimed is:

1. A method for producing an expanded ready-to-eat cereal which is fortified with a particulate insoluble component comprising:
    admixing at least one flour, water, and pellets in an extruder to form a dough, the pellets formed by admixing a particulate insoluble component, water, and a binder component in an extruder to bind the particles of the particulate insoluble component into a coherent mass, wherein the extrusion is conducted at a temperature of the mass at the extruder exit of less than 100° C. and a pressure of less than about 150 bars whereby the pellets are not expanded during extrusion, the binder component comprising at least one member selected from the group consisting of partially gelatinized starches and fully gelatinized starches, extruding the mass through a die to obtain an extrudate rope, cutting the extrudate rope into pieces, and drying the pieces to obtain pellets, wherein the amount of binder component is from about 5% by weight to about 40% by weight, and the amount of the insoluble component is from about 60% by weight to about 95% by weight, based upon the total dry weight of the particulate insoluble component and the binder component, and the pellets have a particle size of from about 500 µm to about 1.5 mm;

extruding the dough through an extruder die to expand the dough, and cutting the expanded dough into pieces to obtain an expanded ready-to-eat cereal wherein a plurality of the pellets are distributed substantially uniformly throughout the pieces of expanded ready-to-eat cereal, the expanded cereal pieces having a cell structure comprising cell walls which form voids, the pellets are partially or completely contained in the cell walls or attached to the cell walls, the amount of the pellets is from about 5% by weight to about 50% by weight, based upon the total weight of the ready-to-eat cereal, wherein the particulate insoluble component of the pellets comprises at least one member selected from the group consisting of fibers and calcium components, and the binder component of the pellets comprises the partially or fully gelatinized starch in an amount of at least about 50% by weight, based upon the weight of the binder component.

2. A method as claimed in claim 1 wherein the particulate insoluble component comprises fiber.

3. A method as claimed in claim 2 wherein the fiber comprises at least one member selected from the group consisting of wheat bran, wheat fiber, corn bran, oat hull fiber, pea hull fiber, soy hull fiber, soy cotyledon fiber, sugar beet fiber, rice fiber, barley fiber, rye fiber, resistant starch, sugar cane fiber, sorghum fiber, vegetable fiber, fruit fiber, and microcrystalline cellulose, the total amount of the insoluble component and the binder component is at least about 75% by weight of the pellet, and the pellet contains at least one additive in an amount of up to about 25% by weight of the pellet.

4. A method as claimed in claim 1 wherein the particulate insoluble component comprises insoluble dietary fiber.

5. A method as claimed in claim 1 wherein the amount of the particulate insoluble component is from about 75% by weight to about 90% by weight, and the amount of the binder component is from about 10% by weight to about 25% by weight, based upon the total dry weight of the particulate insoluble component and the binder component, and the pellet has a particle size of from about 500 µm to about 1.5 mm.

6. A method as claimed in claim 1 wherein the amount of the particulate insoluble component is from about 80% by weight to about 85% by weight, and the amount of the binder component is from about 15% by weight to about 20% by weight, based upon the total dry weight of the particulate insoluble component and the binder component, and the pellet has a particle size of from about 800 µm to about 1200 µm.

7. A method as claimed in claim 1 wherein the amount of insoluble dietary fiber is from about 75% by weight to about 90% by weight, and the amount of the binder component is from about 10% by weight to about 25% by weight, based upon the total dry weight of the particulate insoluble component and the binder component.

8. A method as claimed in claim 1 wherein the binder component comprises a gelatinized starch in an amount of at least about 50% by weight, based upon the weight of the binder component, and an additional binding agent in an amount of up to about 50% by weight, based upon the weight of the binder component, wherein the additional binding agent is at least one member selected from the group consisting of hydrocolloids, soluble fibers, proteins, converted starches, dextrins, maltodextrins, glucose syrups, and sugars.

9. A method as claimed in claim 1 wherein the binder component is a gelatinized starch.

10. A method as claimed in claim 1 wherein the gelatinized starch is a pregelatinized starch.

11. A method for producing pellets as claimed in claim 1 wherein the particulate insoluble component comprises at least one particulate fiber component selected from the group consisting of wheat bran, wheat fiber, corn bran, oat hull fiber, pea hull fiber, soy hull fiber, soy cotyledon fiber, sugar beet fiber, rice fiber, barley fiber, rye fiber, resistant starch, sugar cane fiber, sorghum fiber, vegetable fiber, fruit fiber, and microcrystalline cellulose, wherein the amount of fiber is from about 75% by weight to about 90% by weight, and the amount of the binder component is from about 10% by weight to about 25% by weight, based upon the total dry weight of the fiber and the gelatinized starch, and wherein the particulate insoluble component which is added to the extruder has a particle size of less than about half the diameter of the extrusion die.

12. A method for producing an expanded ready-to-eat cereal as claimed in claim 1 wherein the particulate insoluble component comprises at least one member selected from the group consisting of wheat bran, wheat fiber, corn bran, oat hull fiber, pea hull fiber, soy hull fiber, soy cotyledon fiber, sugar beet fiber, rice fiber, barley fiber, rye fiber, resistant starch, sugar cane fiber, sorghum fiber, vegetable fiber, fruit fiber, and microcrystalline cellulose, the binder component is a gelatinized starch, the amount of the particulate insoluble component of the pellets is from about 75% by weight to about 90% by weight, and the amount of the binder component is from about 10% by weight to about 25% by weight, based upon the total dry weight of the particulate insoluble component and the binder component.

13. The method according to claim 1, wherein the pellets have a particle size from 800 µm to 1200 µm.

* * * * *